Aug. 3, 1937.  G. E. MOLYNEUX  2,088,804
POWER TRANSMISSION DEVICE
Filed June 6, 1935  4 Sheets-Sheet 4
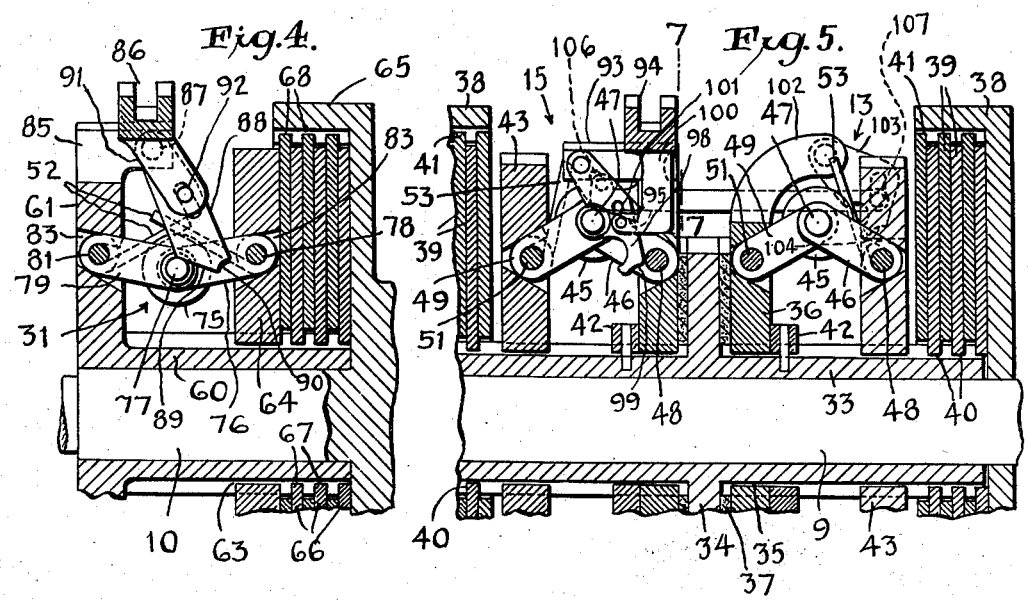
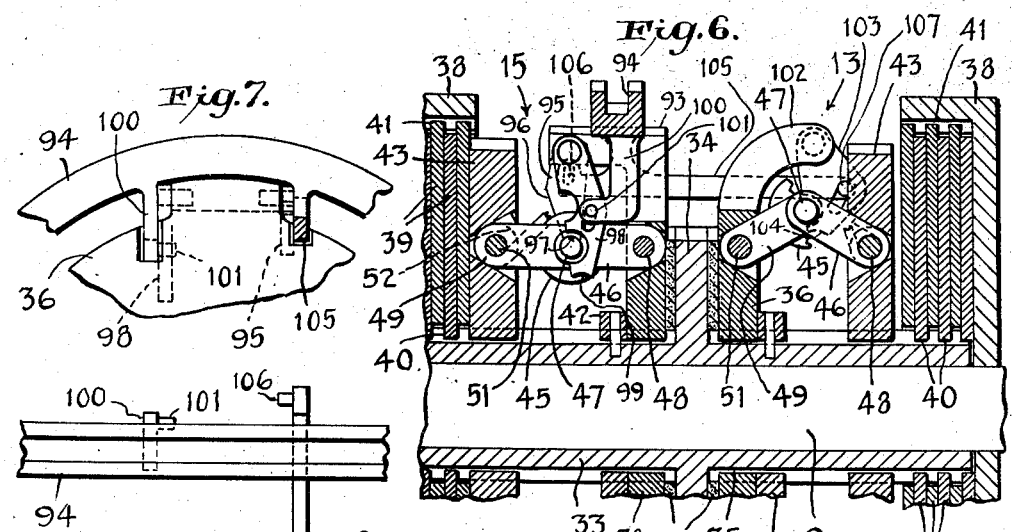
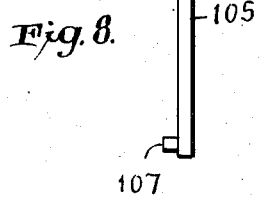
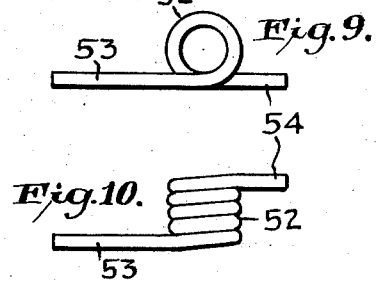
INVENTOR
George E. Molyneux
BY
Geo. A. Senior
HIS ATTORNEY Patented Aug. 3, 1937

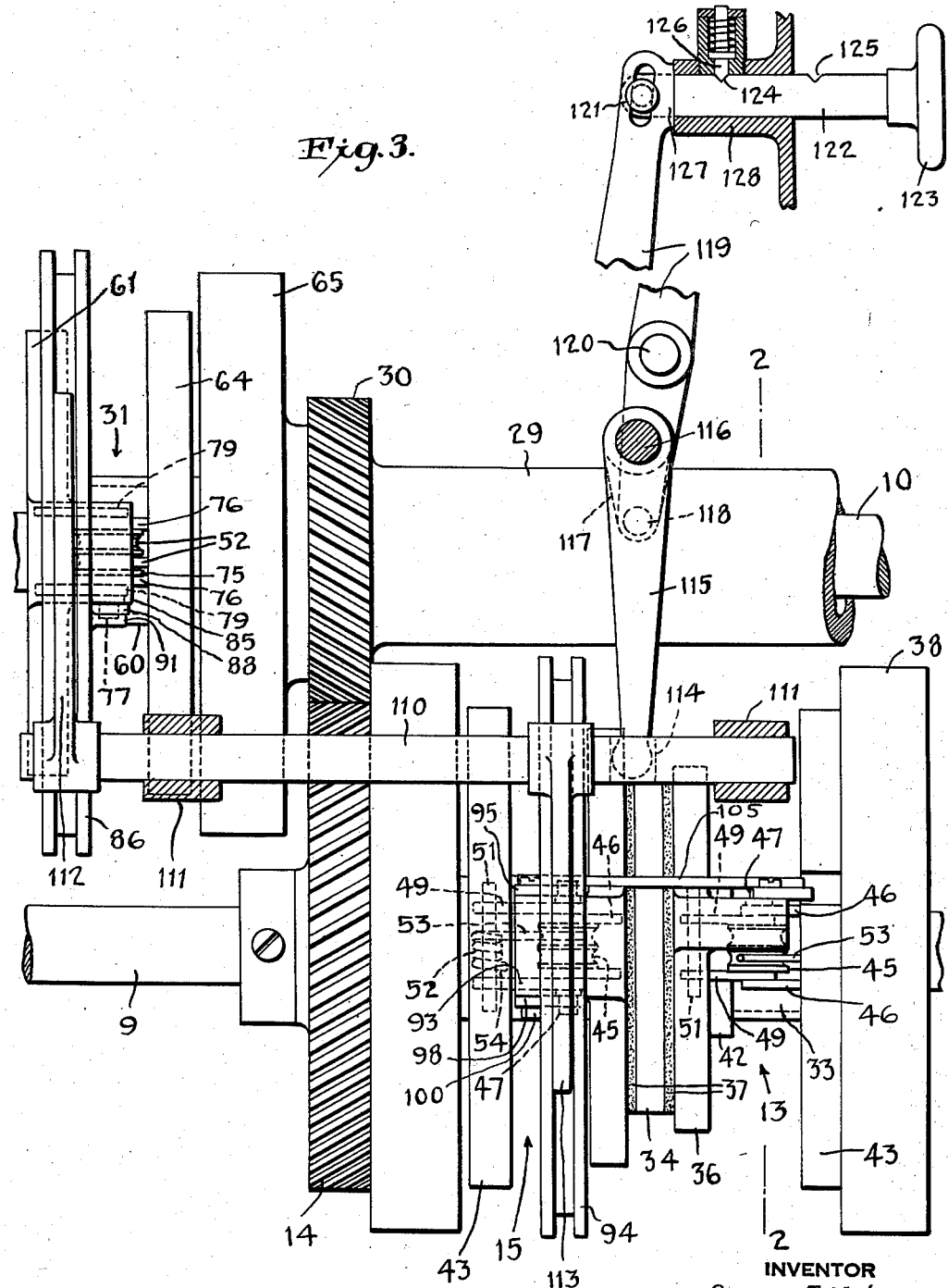

2,088,804

UNITED STATES PATENT OFFICE 2,088,804

POWER TRANSMISSION DEVICE

George E. Molyneux, Bayonne, N. J.

Application June 6, 1935, Serial No. 25,202

7 Claims. (Cl. 74—336)

The invention relates to power transmission devices and has been developed with particular reference to motor vehicles. However, its adaptability to other uses, wherever it is desired to control automatically the speed of transmission, as between a driving member and a driven member, will be readily apparent.

The invention follows the general plan set forth in my prior Patent No. 1,950,992 dated March 13, 1934. As in that patent, the main purpose of the invention is to enable the engagement of different transmission gears to be determined by the speed of the driving member.

In my aforesaid mentioned prior patent the general purpose of the invention was accomplished through the use of overrunning clutches interposed at suitable points in the chain of gears, the effective engagement of each of such overrunning clutches being controlled by centrifugal action. In the present invention friction clutches are utilized in lieu of overrunning clutches. This makes for a considerable simplification of the parts and provides a device which is much more effective and efficient in operation.

While friction clutches are illustrated and described, it is to be understood numerous other known types of clutches may be utilized. In accordance with the invention centrifugal means will cause the clutch of the first or low speed set of gears to be engaged with that set of gears. As the speed increases and additional centrifugal force becomes effective the clutch of the low speed set of gears will be disengaged. In the meantime means actuated by centrifugal force will cause the second or intermediate set of gears to be clutched. These in turn are disengaged from their clutch by the centrifugal means and the high speed gear is clutched to its shaft by centrifugally operated means. At this time the driving member is directly connected to the driven member. Means are provided so that this connection will not be disturbed as the speed further increases.

The invention as illustrated and described shows a low, second and high speed. However, it will be apparent that any number of sets of change speed gears may be arranged between the low and high speed.

In accordance with the invention the master clutch of an automotive vehicle is eliminated, as is the gear shift lever. The transmission readily lends itself to be operated by a button or small lever on the dash board.

Another aspect of the invention is that regardless of conditions it is practically impossible to stall the motor of the vehicle.

Still another important result accomplished is the fact of being able to start the car or move from one speed to another with an absolutely smooth action and without any possibility of jerking. One would not know or be able to tell when the transmission is being changed from one speed to another.

A further object of the invention is the provision of means whereby the transmission may be held in low or reverse gear and the second or intermediate and high speed gear positively held out of action. This is particularly advantageous in starting the car or on a steep hill or when at any time the full power of the engine is required.

Still another feature of the invention is the provision of means for holding the automatic shift out and causing the transmission to be held in second gear. This arrangement permits of the full power of the engine being utilized while in second gear. It also provides a means whereby the braking effect of the engine may be utilized in coming down a steep hill.

The mechanism for holding the transmission in second gear and low or reverse gear is of extreme simplicity and so designed as to be absolutely foolproof. As illustrated it is manually operated by a button or handle on the dash board although this may be varied. When the operating handle is in what might be termed the inner or normal position the transmission is operating fully automatic. Should the engine be stopped or the transmission running in low or reverse gear and the handle is pulled the second and high speed gears are positively held out of action and the low or reverse gear held in and the full power of the engine may thus be utilized in low or reverse gear. If the transmission were in high and the handle pulled the same mechanism would function to disconnect the high speed clutch and hold the transmission in second or intermediate gear. Thus, should the operating handle inadvertently be pulled at any time no damage or ill effects can ensue.

The invention will be fully explained hereinafter with reference to the accompanying drawings in which one embodiment of the invention is illustrated and in which Figure 1 is a view in side elevation of the transmission mechanism, the housing being shown in section, parts being broken out for clearness of illustration, parts being in section and parts being broken away for economy of space;

Figure 3 is a fragmentary elevational view particularly illustrating certain features of the invention;

Figure 4 is a fragmentary detail sectional view taken on line 4—4 of Figure 2, illustrating the high speed clutch and the mechanism for forcing and holding it out of action;

Figure 5 is a fragmentary detail sectional view taken on line 5—5 of Figure 2 and illustrating the intermediate and low or reverse speed clutches and the mechanism for holding them out of action or in engagement as the case may be;

Figure 6 is a view similar to Figure 5 with the parts in another position;

Figure 7 is a fragmentary detail sectional view taken on line 7—7 of Figure 5;

Figure 8 is a fragmentary plan view of the grooved ring used in connection with the second and low or reverse speed clutches; and Figures 9 and 10 are detail elevations of one of the springs used in connection with the centrifugal weights.

Figure 1:
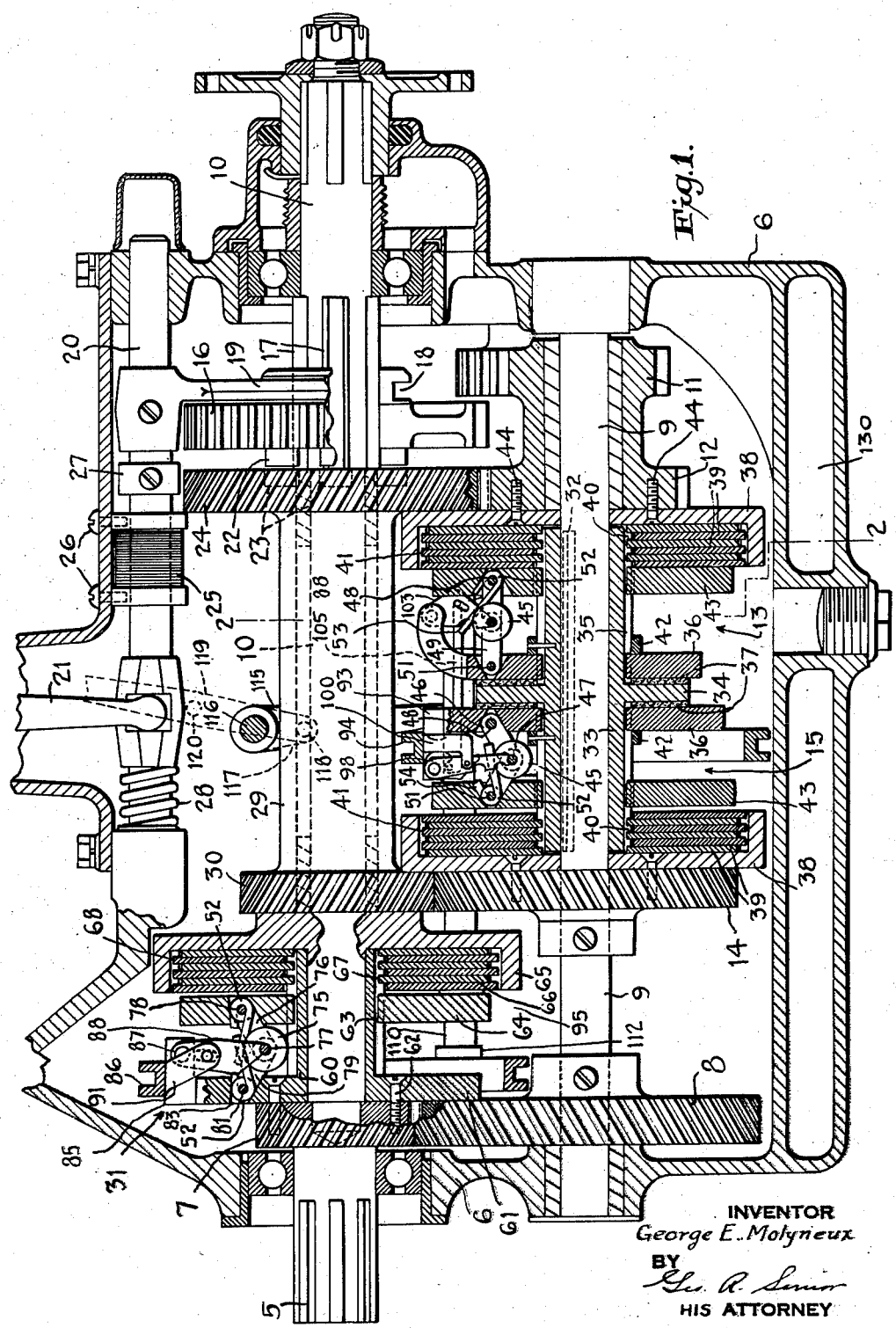

Referring again to the drawings in the embodiment of the invention illustrated a shaft 5, which may be coupled to a motor and may be taken as the driving member, is mounted in a suitable bearing in a housing 6 and may have secured thereto or made integral therewith a gear 7 which meshes a corresponding gear 8 fixed on a shaft 9 which in turn is mounted in suitable bearings in the housing 6. A shaft 10 parallel with the shaft 9 is supported at one end in the gear 7 and at the other end in a suitable bearing in the housing. The shaft 10 may be taken as the driven member.

The shaft 9 supports a reverse gear 11, a low speed gear 12, a friction disc clutch 13, a second speed gear 14, another friction disc clutch 15 and the heretofore mentioned gear 8. The shaft 10 supports a gear 16 which is splined on the shaft as indicated at 17, so that it may be moved longitudinally on the shaft while remaining in rotative engagement therewith. The gear 16 has a grooved hub 18 engaged by a fork 19 which is carried by a shaft 20, operatively connected with a manual lever 21 by which the gear 16 can be moved into engagement with the reverse gear 11. The hub 18 is also formed with clutch teeth, as at 22, for engagement with corresponding teeth 23 on a gear 24, hereinafter described, so that the driven shaft 10 may, at will, be driven from such gear.

Means are provided in connection with the shaft 20 whereby the clutch 22—23 will be automatically disengaged if the engine should stop for any reason. The shaft 20 passes through an electric magnet 25 which is energized by the generator on the motor. The electric magnet 25 is secured to the housing by screws 26 and an armature 27 is mounted on the shaft 20 adjacent one end of the magnet. The manual lever 21 throws the clutch 22—23 into engagement at idling speed and moves the armature 27 against the magnet 25. Sufficient energy is transmitted from the generator to the magnet to hold the parts in this position. Should the motor and generator stop a spring 28, interposed between a boss on the housing and a member fixed to the shaft 20, will cause the armature 27 to move away from the magnet 25 and the clutch 22—23 to be disengaged. Whenever the engine stops the just-described mechanism will function.

The shaft 10 further supports a sleeve 29, loosely mounted thereon, and the sleeve carries at one end the gear 24 which engages the low speed gear 12 and at the other end a gear 30 which engages the second speed gear 14, the hub of the gear 24 having the clutch teeth 23 for co-action with the clutch teeth 22 of the gear 16. In addition the shaft 10 supports a friction disc clutch 31.

The several clutches 13, 15 and 31 are similarly constructed and description of one will answer for each of the others, except for such differences as will be called to attention.

Taking first the clutch 13, it will be seen that there is secured on the shaft 9 by a suitable key 32 a sleeve 33 which has formed on its intermediate portion a flange 34. Splined to the sleeve 33, as indicated at 35, is an annular member 36. Interposed between the annular member 36 and flange 34 is a washer 37 which is pressed in place and formed of tough leather or some other yielding material having a small degree of give or resiliency. This provides a yielding means which serves an important function, as will be hereinafter described.

The sleeve 33 extends into a cup-shaped member 38 which is freely mounted on the shaft 9 and which houses a plurality of friction discs 39. These friction discs are alternately splined to the sleeve 33, as indicated at 40, and to the flange of the cup-shaped member, as indicated at 41. A collar 42, pinned or otherwise secured to the sleeve 33, prevents longitudinal movement of the annular member 36 away from the flange 34. Splined to the sleeve 33, adjacent the friction discs 39, is an annular pressure plate 43. The low speed gear 12 and reverse gear 11, which are made integral, are secured to the cup-shaped member 38 by screws 44.

The annular member 36 and the pressure plate 43 carry the centrifugal weights 45. Arms 46, pivoted to the weights at 47, are in turn pivoted at 48 in the pressure plate 43 and other arms 49, pivoted at 47 to the weights, have their opposite ends pivoted at 51 in the annular member 36. Springs 52, particularly illustrated in Figures 4 and 5, are coiled about the pivot pins 48 between the arms 46. The springs are placed in tension about the pins 48 and their long arms 53 bear against the weights 45 and the short arms 54 contact the sloped surface of the openings in the pressure plate 43 in which the pins 46 are mounted. These openings are so shaped as to limit the outer and inner travel of the centrifugal weights. As the weights move outwardly the springs are being wound, therefore the further out the weights move the greater is the pressure exerted to retract them.

In Figure 1 the parts are shown with the low speed gear in engagement. However, no power is being transmitted from the driving member to the driven member due to the fact that the clutch 22—23 is not in engagement. When the centrifugal weights 45 are in their inner position, as shown in the clutches 15 and 31 the friction clutch discs 39 are not in engagement with each other. When the clutch 22—23 is engaged and the motor exceeds the idling speed centrifugal force will cause the weights 45 to start to move outwardly. The discs 39 are then moved into engagement with each other, as shown in Figure 1, and against the inner face of the cup-shaped member 38. As this engagement is being effected the parts are so arranged that driving action gradually takes place with a certain amount of slippage so as to insure the vehicle starting smoothly. The weights 45, due to centrifugal action, continue to move outwardly and prior to their assuming the intermediate or straight line position of Figure 1 the discs are all in positive engagement. The yielding member 37 is now being slightly compressed and when the straight line or intermediate position is reached the full power of the clutch is being exerted. In addition to acting as a yielding member, to permit free action of the weights 45 in or about their straight line position, the member 37 functions to compensate for wear on the discs or other clutch parts. As the parts wear slightly the distance the weights travel while exerting full power on the clutch will be slightly lessened without interfering with its efficient operation.

When the clutch 13 is functioning the cup-shaped member 38 and low speed gear 12 and reverse gear 11, attached thereto, are rotating and through the medium of gear 24 and the clutch 22—23 the driven member 10 is rotated at low speed.

As the speed increases the weights 45 move further outward until they reach their outer limit. Prior to their assuming this position the clutch 15 will start to function in a manner hereinafter described.

The clutch 15, with the exception of the springs 52, is identical with the clutch 13. The springs 52 of clutch 15 are stronger than the springs 52 of clutch 13 so as to offer an increased yielding resistance to the action of the centrifugal speed-actuated means for engaging the discs 39 of clutch 15.

The springs 52 of clutch 15 are so designed that in the operation the weights 45 of clutch 15 will start to move outwardly before the weights 45 of clutch 13 have assumed their extreme outer position. At this time there is a certain amount of slippage between the discs 39 of the clutch 13 and between the discs 39 of the clutch 15. This makes for an absolutely smooth action in going from first to second speed, or vice versa.

As the speed is further accelerated the weights 45 of clutch 15 continue to move outwardly and, as in clutch 13, prior to their assuming the straight line position, the discs are in positive engagement and the yielding member 37 of clutch 15 is slightly compressed. At this time the second speed gear 14 is being caused to rotate with the cup-shaped member 38 of clutch 15 and through the medium of gear 30 and clutch 22—23 the driven member 10 is rotated at a higher speed. As the weights 45 of clutch 15 continue their outward movement past the intermediate position the high speed clutch 31 starts to function in a manner hereinafter described. Other parts of the clutch 15 bear the same reference numerals as in clutch 13.

In the high speed clutch 31 the grooved sleeve 60, which corresponds to the sleeve 33 of clutches 13 and 15, is formed integral with the annular member 61. The annular member 61 is secured to the gear 8 by screws 62. Splined to the sleeve, as indicated at 63, is an annular pressure plate 64.

The sleeve 60 extends into a cup-shaped member 65 which may be integral with the driven shaft 10 and houses a plurality of friction discs 66. These friction discs are alternately splined to the sleeve 60, as indicated at 67, and to the flange of the cup-shaped member, as indicated at 68.

As in the clutches 13 and 15 the annular flange 61 and the pressure plate 64 carry the centrifugal weights 75. Arms 76, pivoted to the weights at 77, are in turn pivoted at 78 in the pressure plate 64 and other arms 79, pivoted at 77 to the weights, have their opposite ends pivoted at 81 in the flange 61. Springs 52 are coiled about the pivot pins 78 and 81 between the arms 76 and 79, respectively. These springs are similar and function in a like manner to the springs 52 of clutches 13 and 15, with the exception that a pair of springs are utilized for each weight and they are made stronger so as to offer increased yielding resistance to the action of the centrifugal weights 75.

The yielding members 37 of clutches 13 and 15 have been omitted from the high speed clutch 31, but may be utilized if desired. Means are provided on the high speed clutch for preventing the arms 76 and 79 and weights 75 from coming to the straight line position and the means comprises suitably shaping the openings 83 in which the arms are mounted. It is understood the clutch is fully engaged when the weights 75 are as far out as they are permitted to travel.

In the operation, as the speed further increases and the weights 45 of clutch 15 start to move outwardly from the straight away or intermediate position, the weights 75 of the high speed clutch will start to move outwardly and driving relation will be effected between the discs 66. At this time slippage will occur between the discs 66 of the high speed clutch 28 and between discs 39 of the second speed clutch, thus insuring smooth action with no feeling whatsoever in going from second speed into high, or vice versa.

When the weights 75 have moved outwardly to their limit full power is exerted on the clutch and the weights 75 cannot move out beyond this position, regardless of the speed. As the discs and other parts wear slightly the weights will move out a slight amount more before developing full power but, due to the shape of the openings 83, in no event can they move out a sufficient amount to disengage the clutch.

When the clutch 31 is engaged the driven member 10 is being directly acted on. The low and second speed gears are being rotated. but as the weights 45 are in their outer position the clutches 13 and 15 are disengaged and the parts are moving freely. It will be apparent that other sets of change speed gears might be interposed between the low speed and high speed gears.

If the load should be increased during operating, as when a car moves from a level road, with the high speed gears in engagement, to a hill, the effect will be to slow down the car which will automatically cause the disengagement of the high speed clutch and engagement of a lower speed clutch and a corresponding increase in torque. Thus it is impossible to stall the motor.

As heretofore stated, the springs 52 of clutches 13, 15 and 31 are increasingly heavier in the order named so that, as the speed of the driving member 5 exceeds idling speed the clutch 13 shall first become effective and each of the other clutches shall thereafter become effective in succession as the speed of the driving member increases. The opposite naturally holds true as the speed of the driving member decreases.

Any time the engine comes to idling speed all clutches will open. In starting again all that is necessary is to exceed the idling speed and the clutches will function automatically in turn, as heretofore described. Thus the master clutch and gear shifting lever are entirely eliminated and driving greatly simplified.

Another of the important aspects of the invention is the means for maintaining the transmission in low or reverse gear and positively holding the intermediate and high speed clutches out of action and the utilization of this same mechanism for holding and maintaining the intermediate speed clutch in engagement and forcing and holding the high speed clutch out of engagement.

The mechanism in connection with the high speed clutch 31 will first be described. The flange 61 of the high speed clutch is provided with outwardly extending lugs 85, there being one lug for each of the centrifugal weights 75. The outer surface of these lugs provide bearings for a longitudinally movable grooved ring 86.

Pivoted at 87 to one side of the lugs are detents 88 having cam surfaces 89 and engaging faces 90. The grooved ring 86 is provided with inwardly extending ears 91 having pin and slot connections 92 with the detents 88.

When the transmission is running fully automatic and the high speed clutch 31 is in engagement the parts will be in the position shown in Fig. 4. When it is desired to hold the high speed clutch out of action the grooved ring 86 is moved to the left in Fig. 4 by suitable mechanism hereinafter described. The cam surface 89 of the detent 88 engages an extending end of the pivot pin 77 and the centrifugal weights 75 are forced inwardly thus moving the pressure plate 64 out of contact with the discs 66. When the grooved ring 86 has been moved its limit the engaging face 90 will be in contact with the pivot pin 77 as illustrated in Fig. 1 and the high speed clutch will be effectively held out of action until the grooved ring 86 is again moved to the position of Fig. 4. While it has been stated heretofore that the shape of the openings 83 controls the amount of outward movement of the weights 75 it is obvious that the detent 88 will also function as an effective stop to limit the outer movement of the weights 75.

The mechanism in connection with the low or reverse and the intermediate speed clutches will now be described. This mechanism is particularly illustrated in Figs. 5 and 6.

The annular member 36 of the intermediate speed clutch has outwardly extending lugs 93 similar to the lugs 85 of the high speed clutch and as in the high speed clutch the outer surface of the lugs 93 provide a bearing for a longitudinally movable ring 94.

Pivoted at one side of the lugs 93 are detents 95 having cam surfaces 96 and engaging faces 97. The cam faces 96 of the detents 95 engage extending ends of the pins 47 of the centrifugal weights 45 of the intermediate speed clutch 15 and force them to the straightaway position of Fig. 6 where they are held by the engaging faces 97. Pivoted to the opposite side of the lugs 93 are detents 98 having engaging faces 99 for cooperating with extensions from the pivot pins 47 of the intermediate speed clutch when the weights 45 of this clutch are in their retracted position, as shown in Fig. 1, and it is desired to hold them in that position.

The grooved ring 94 has inwardly extending ears 100 having pin and slot connections 101 with the detents 98. Thus when the grooved ring 94 is moved longitudinally the detents 98 will be thrown into or out of the path of the pins 47 of the second speed clutch. The detents 98 are provided with notches or cutout portions for clearance purposes when the weights are in their straightaway position as shown in Fig. 6 or in their outer position as shown in Fig. 5.

Figure 2:
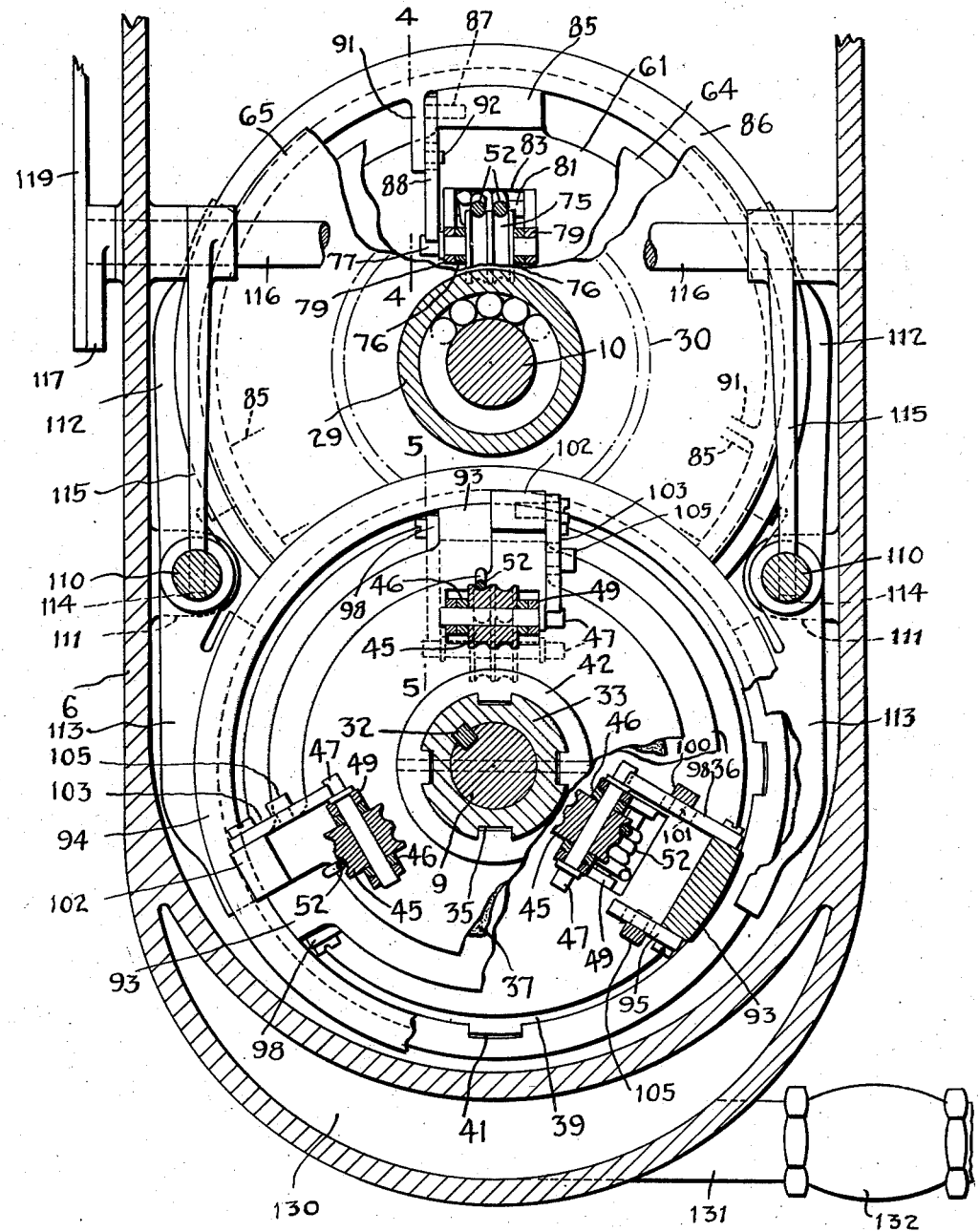
Figure 2 is a fragmentary cross-sectional view taken on lines 2—2 of Figures 1 and 3.

The annular member 36 of the low speed clutch has radiating arms 102 to the outer end of which are pivoted detents 103. The detents 103 have engaging faces 104 for cooperating with extensions from the pivot pins 47 of the low or reverse speed clutch when it is desired to hold the low or reverse speed clutch in engagement as shown in Fig. 1. The detents 43 also have a notched or cutout portion for clearing the pins 47 of the low speed clutch when the weights are in their outer position as illustrated in Fig. 2 and the intermediate speed clutch is being held in engagement.

Common means are utilized for moving the detents 95 and 103. This means comprises bars 105 secured to or made integral with the grooved ring 94 and having pin and slot connections 106 with the detents 95 and similar pin and slot connections 107 at the opposite ends with the detents 103.

The means for moving the grooved rings 86 and 94 will now be described. Shafts 110 are mounted in inwardly extending lugs 111 from the housing 6. These shafts have a pair of upwardly extending arms 112 for engaging either side of the grooved ring 86 and a pair of downwardly extending arms 113 for engaging either side of the grooved ring 94.

Slots 114 in the shafts 110 are engaged by the rounded ends of levers 115 secured to a transverse shaft 116. A short arm 117 is secured to the outer end of this shaft and has pivoted thereto at 118 one end of a lever 119 which is fulcrumed at 120. The upper end of this lever has a pin and slot connection 121 with a pull rod 122 which may be mounted on the dash. The pull rod has a handle or knob 123 on its outer end and is provided with notches 124 and 125 either one of which may be engaged by a spring pressed plunger 126. When the knob 123 has been pulled out and the plunger 126 is engaging the notch 124 stop faces 127 on the lever 119 abut the end of the bearing 128 in which the pull rod 122 is mounted and prevent further outward movement of the pull rod. When the pull rod has been pushed in and the plunger 126 is engaging the notch 125 the hub of the handle abutting the dash prevents further inward movement. In this manner the shafts 110 are moved longitudinally so as to move the grooved rings 86 and 94 the required amount in one direction or the other. The means shown and described for moving the grooved rings is purely illustrative and may be widely varied.

In the position of the clutches shown in Figs. 4 and 5 the transmission is running fully automatic and the high speed clutch 31 is engaged and the driving member is directly connected to the driven member. At this time the handle 123 of the pull rod 122 is in its inner position. The weights 45 of the intermediate and low or reverse speed clutches are in their outer positions and the detents 98 and 103 are clear of the pivot pins 47. The top end of the cam surface 96 of the detent 95 is in contact with the extension of the pivot pin 47 of the intermediate speed clutch 15.

When it is desired to utilize the full power of the engine in second speed and cause the high speed clutch to be forced out of engagement and held out of engagement the handle 123 is pulled outwardly and the grooved rings 86 and 94 are moved to the left. The detent 88 forces the weights 74 inwardly as shown in Fig. 1 and heretofore described and the cam surface 96 of the detent 95 causes the weights 45 to assume the straightaway position as shown in Fig. 6 and they are held in this position by the engaging face 97 of the detent 95. The lower cutout or notch in the detent 98 permits of this detent clearing the pin 47 in this position and the cutout or notch in the detent 103 permits of this detent clearing the pin 47 of the low speed or reverse clutch. Naturally if the second speed clutch were in engagement and the handle 123 pulled outwardly the operation would be the same and the second speed clutch would be held in engagement and the high speed clutch held out.

When the engine is idling or the low or reverse gear is in engagement and the handle 123 is pulled out the high and intermediate speed clutches are held out of engagement and the low or reverse speed clutch is held in engagement, the parts assuming the position shown in Fig. 1. At this time the engaging face 99 of the detent 98 is held against the pivot pin 47 of the second speed clutch and prevents this clutch from functioning and the high speed clutch is held out as heretofore described. The engaging face 104 of the low or reverse speed clutch is in contact with the pivot pin 47 of this clutch and prevents the pressure plate 43 from moving away from the discs 39 thus holding the low or reverse speed clutch in engagement.

As it is necessary for the entire transmission to run in oil means are provided for heating the oil in extremely cold weather so as to prevent any possibility of the friction discs sticking. For this purpose the housing 6 has a double wall in its lower portion so as to provide a space 130 into which hot air may be admitted from the exhaust through a pipe 131. A thermostatic valve 132 is interposed in this pipe to shut off the supply of hot air after the desired temperature has been reached.

While the means in connection with the shaft 20 for automatically disengaging the clutch 22—23 if the engine stops has been described and set forth as being actuated electrically from the generator it is desired to point out the same result may be accomplished mechanically from some moving part of the engine or it may be operated by vacuum produced in the engine cylinders or water pressure from the cooling system.

Another important phase of the arrangement for maintaining the clutches in or out of engagement is the fact that all wear and tear on the parts of the clutch mechanisms is eliminated. The arms 112 and 113 run freely in the grooved rings when the transmission is operating fully automatic. After the pull rod 122 has been pulled out and the grooved rings 86 and 94 moved to cause the detents 88, 95, 98 or 103 to engage the pivot pins of the centrifugal weights the entire strain is taken by the detents and the arms 112 and 113 again run freely in the grooved rings 86 and 94.

It will be understood that various changes in details of construction and arrangement of parts can be made to suit different conditions of use and that, except as pointed out in the accompanying claims, the invention is not restricted to the particular construction shown and described herein.

I claim:

1. In a power transmission device the combination of a driving shaft, a counter shaft, constant mesh gearing connecting said driving shaft and said counter shaft, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, devices cooperating with said centrifugal speed actuated weights to offer yielding resistance thereto, said devices successively offering increased resistance, whereby each clutch becomes effective at a different speed, and manually operated means cooperating with said centrifugal speed actuated weights whereby said clutches may be held in engagement.

2. In a power transmission device the combination of a driving shaft, a counter shaft, constant mesh gearing connecting said driving shaft and said counter shaft, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, devices cooperating with said centrifugal speed actuated weights to offer yielding resistance thereto, said devices successively offering increased resistance, whereby each clutch becomes effective at a different speed, detents cooperating with said centrifugal speed actuated weights, and manually operated means for moving said detents into or out of engagement with said weights whereby said detents will cause said clutches to be held in engagement.

3. In a power transmission device the combination of a driving shaft, a counter shaft, a gear secured to said driving shaft, a gear secured to said counter shaft, said gears on said driving shaft and on said counter shaft being constantly meshed, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, a friction clutch in operative relation with the driven shaft and the gear secured to said driving shaft, centrifugal speed actuated weights cooperating with said clutch, means whereby said weights in their initial movement cause the clutch to effect driving engagement and connect the driving shaft directly with the driven member, devices cooperating with said centrifugal speed actuated weights to offer yielding resistance thereto, said devices successively offering increased resistance, whereby each clutch becomes effective at a different speed, and manually operated means cooperating with said centrifugal speed actuated weights whereby the low speed clutch is maintained in engagement and the higher speed clutches are held out of action.

4. In a power transmission device the combination of a driving shaft, a counter shaft, a gear secured to said driving shaft, a gear secured to said counter shaft, said gears on said driving shaft and on said counter shaft being constantly meshed, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, a friction clutch in operative relation with the driven shaft and the gear secured to said driving shaft, centrifugal speed actuated weights cooperating with said clutch, means whereby said weights in their initial movement cause the clutch to effect driving engagement and connect the driving shaft directly with the driven member, devices cooperating with said centrifugal speed actuated weights to offer yielding resistance thereto, said devices successively offering increased resistance, whereby each clutch becomes effective at a different speed, detents cooperating with each set of centrifugal speed actuated weights, and manually operated means for moving said detents into or out of engagement with said weights whereby said detents will cause the low speed clutch to be maintained in engagement and the higher speed clutches held out of action.

5. In a power transmission device the combination of a driving shaft, a counter shaft, a gear secured to said driving shaft, a gear secured to said counter shaft, said gears on said driving shaft and on said counter shaft being constantly meshed, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, a friction clutch in operative relation with the driven shaft and the gear secured to said driving shaft, centrifugal speed actuated weights cooperating with said clutch, means whereby said weights in their initial movement cause the clutch to effect driving engagement and connect the driving shaft directly with the driven member, devices cooperating with said centrifugal speed actuated weights to offer yielding resistance thereto, said devices successively offering increased resistance, whereby each clutch becomes effective at a different speed, and manually operated means cooperating with said centrifugal speed actuated weights whereby the intermediate speed clutch is maintained in engagement and the high speed clutch held out of action.

6. In a power transmission device the combination of a driving shaft, a counter shaft, a gear secured to said driving shaft, a gear secured to said counter shaft, said gears on said driving shaft and on said counter shaft being constantly meshed, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, a friction clutch in operative relation with the driven shaft and the gear secured to said driving shaft, centrifugal speed actuated weights cooperating with said clutch, means whereby said weights in their initial movement cause the clutch to effect driving engagement and connect the driving shaft directly with the driven member, devices cooperating with said centrifugal speed actuated weights to offer yielding resistance thereto, said devices successively offering increased resistance, whereby each clutch becomes effective at a different speed, detents cooperating with said centrifugal speed actuated weights and manually operated means for moving said detents into or out of engagement with said weights whereby said detents will cause the intermediate speed clutch to be maintained in engagement and the high speed clutch to be held out of action.

7. In a power transmission device the combination of a driving shaft, a counter shaft, a gear secured to said driving shaft, a gear secured to said counter shaft, said gears on said driving shaft and on said counter shaft being constantly meshed, change speed gears freely mounted on said counter shaft, friction clutches in operative relation with said gears, centrifugal speed actuated weights cooperating with said clutches to control the engagement and disengagement thereof, means whereby said weights in their initial movement will cause the clutches to effect driving engagement and in their further movement cause the clutches to be disengaged, a driven shaft, gears freely rotatable on said driven shaft and in constant mesh with said change speed gears on said counter shaft, means for clutching said freely rotatable gears to said driven shaft, a friction clutch in operative relation with the driven shaft and the gear secured to said driving shaft, centrifugal speed actuated weights cooperating with said clutch, means whereby said weights in their initial movement cause the clutch to effect driving engagement and connect the driving shaft directly with the driven member, devices cooperating with said centrifugal speed actuated weights to offer yielding resistance thereto, said devices successively offering increased resistance, whereby each clutch becomes effective at a different speed, manually operated means cooperating with said centrifugal speed actuated weights whereby when the high or intermediate speed clutches are in operation the intermediate speed clutch may be maintained in engagement and the high speed clutch held out of action, the same means functioning when the low or reverse speed clutch is in engagement to maintain said clutch in engagement and hold the higher speed clutches out of action.

GEORGE E. MOLYNEUX.